United States Patent [19]

Bell

[11] Patent Number: 4,554,628

[45] Date of Patent: Nov. 19, 1985

[54] SYSTEM IN WHICH MULTIPLE DEVICES HAVE A CIRCUIT THAT BIDS WITH A FIXED PRIORITY, STORES ALL LOSING BIDS IF ITS BID WINS, AND DOESN'T BID AGAIN UNTIL ALL STORED BIDS WIN

[75] Inventor: John L. Bell, Escondido, Calif.

[73] Assignee: Burroughs Corporation, Detroit, Mich.

[21] Appl. No.: 670,117

[22] Filed: Nov. 9, 1984

Related U.S. Application Data

[63] Continuation of Ser. No. 293,453, Aug. 17, 1981, abandoned.

[51] Int. Cl.[4] .............................................. G06F 9/46
[52] U.S. Cl. .................................................... 364/200
[58] Field of Search ... 364/200 MS File, 900 MS File

[56] References Cited

U.S. PATENT DOCUMENTS

| 3,573,856 | 4/1971 | Best | 364/200 |
|---|---|---|---|
| 3,947,824 | 3/1976 | Doehle | 364/900 |
| 4,009,470 | 2/1977 | Danilenko et al. | 364/200 |
| 4,096,569 | 6/1978 | Barlow | 364/200 |
| 4,096,571 | 6/1978 | Vander Mey | 364/200 |
| 4,237,534 | 12/1980 | Felix | 364/200 |
| 4,257,095 | 3/1981 | Nadir | 364/200 |
| 4,292,668 | 9/1981 | Miller et al. | 364/200 |
| 4,384,323 | 5/1983 | Ahuja | 364/200 |
| 4,395,753 | 7/1983 | Comfort et al. | 364/200 |
| 4,433,375 | 2/1984 | Vinot | 364/200 |
| 4,449,183 | 5/1984 | Flahive | 364/200 |
| 4,499,538 | 2/1985 | Finger | 364/200 |

OTHER PUBLICATIONS

A. D. Edgar, *Bus Arbitation Logic*, IBM Tech. Disclos. Bull., (vol. 23, No. Sep. 1980), pp. 1323-1325.

Primary Examiner—Raulfe B. Zache
Assistant Examiner—Archie E. Williams, Sr.
Attorney, Agent, or Firm—Charles J. Fassbender; Kevin R. Peterson

[57] ABSTRACT

A bid control circuit is incorporated into a device on a time-shared data bus to control the sequence by which that device bids for the use of the bus. In one preferred embodiment, the bid control circuit includes a means for determining if a bid from that device to use the bus is the highest priority bid being made, a means for storing all bids other than its own bid upon the determination that its bid has the highest priority and that other devices were bidding for the bus and lost, and a means for inhibiting its own future bids until those devices having their bids stored have obtained the use of the bus subsequent to the storing operation.

9 Claims, 8 Drawing Figures

SYSTEM IN WHICH MULTIPLE DEVICES HAVE A CIRCUIT THAT BIDS WITH A FIXED PRIORITY, STORES ALL LOSING BIDS IF ITS BID WINS, AND DOESN'T BID AGAIN UNTIL ALL STORED BIDS WIN

This is a continuation of application Ser. No. 293,453, filed Aug. 17, 1981, entitled BID CONTROL CIRCUIT FOR TIME-SHARED BUS, now abandoned.

BACKGROUND OF THE INVENTION

This invention relates to data processing systems having a time-shared data bus over which a plurality of devices send messages in a time-shared fashion, and more particularly to control circuits for resolving the sequence by which the bus is time-shared when several of the devices request to use the bus at the same time.

Figure 1:
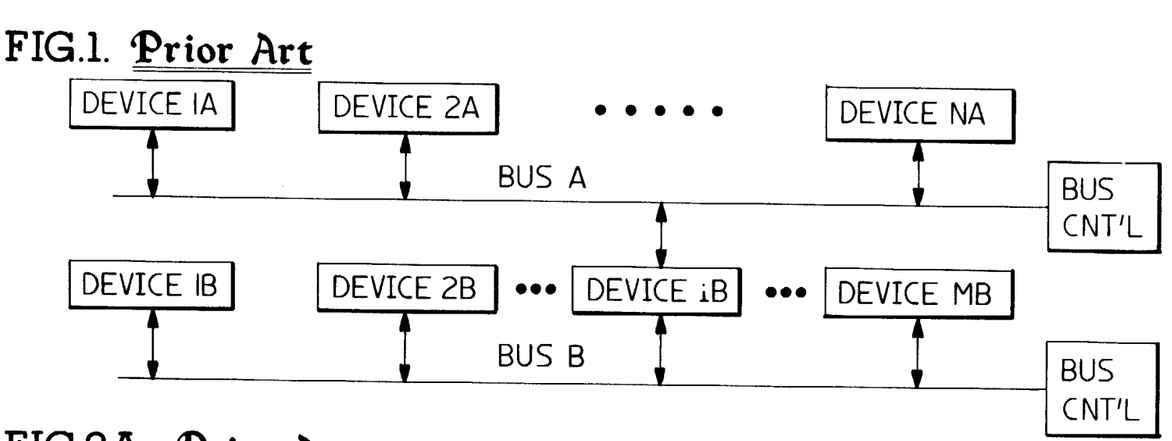
FIG. 1 is a block diagram of a prior art system including a plurality of devices on a time-shared data bus in which the present invention can be incorporated to improve the system operation.

To put this invention into perspective, reference should be made to FIGS. 1 and 2A-2C wherein one data processing system incorporating a prior art time-shared data bus and its operation is illustrated. In the system of FIG. 1, a first plurality of N devices (labeled Device 1A through Device NA) couple to a first time-shared data bus (labeled Bus A), and a second plurality of M devices (labeled Device 1B through Device MB) couple to a second time-shared data bus (labeled Bus B).

These devices send messages to each other over the respective bus to which they are connected in a time-shared fashion. Also, the ith device on bus B (device IB) connects to both bus A and bus B; and it operates to receive messages from devices on bus A and pass those messages to devices on bus B.

Note that the exact makeup of each of the devices in FIG. 1 is unimportant to this invention. That is, the devices in FIG. 1 can be any mix of a wide variety of data processors and peripherals, such as tapes and disks and card readers and printers for example. However, what is important with regard to this invention is the manner in which the devices are given access to their respective buses; and how conflicts are resolved when several devices request to use one bus at the same time.

In the prior art, this bus contention problem was often handled by providing a bus controller (BUS CNT'L) along with each bus as illustrated in FIG. 1. Each device requested to use the bus by sending a bid signal to the bus controller; and the bus controller in turn sent a signal back to one of those bidding devices indicating that the bus was available for its use. To pick that one device, all of the devices on the bus bid with a pre-assigned priority (e.g.,—device 1A had the highest priority, device 2A had the next highest priority, etc.). And the bus controller gave the bus to the one device that was bidding with the highest priority.

Figure 2A:
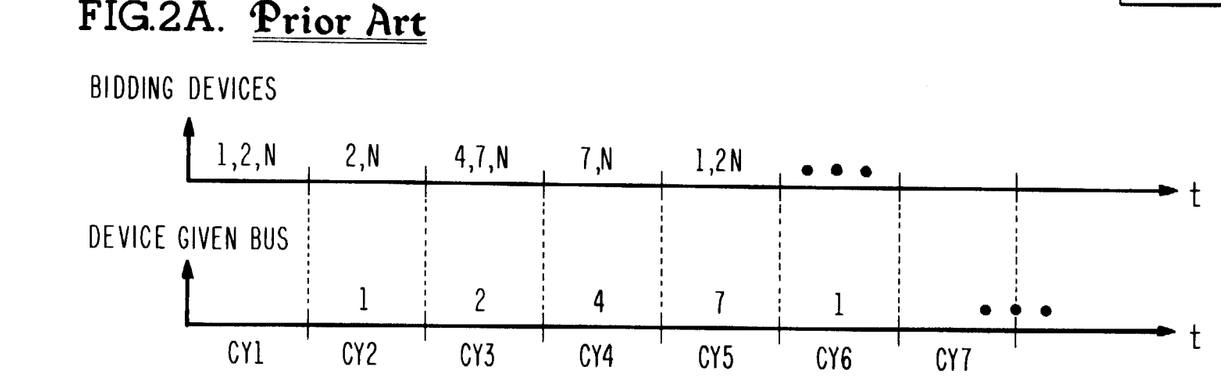
FIGS. 2A-2C are timing diagrams illustrating some of the problems associated with the prior art system of FIG. 1.

FIG. 2A shows the sequence of operation of the above-described bus controller. That figure contains two graphs with "time" on the horizontal axis, "bidding devices" on one vertical axis, and "device given the bus" on the other vertical axis. Also, time on the horizontal axis is divided into cycles labeled CY1, CY2, ... , etc.

During cycle 1, devices 1, 2, and N are illustrated as bidding for the same bus (e.g., bus A). Of those bidding devices, device 1 has the highest priority; so it is given the bus during cycle 2. Then during cycle 2, devices 2 and N again bid for the bus. Between devices 2 and N, device 2 has the highest priority; so it is granted the use of the bus during cycle 3. Then during cycle 3, devices 4 and 7 start to bid for the bus along with the previously bidding device N. Device 4 is given the bus during cycle 4 because it is the highest bidding device during the preceding cycle 3. Device 7 is given the bus during cycle 5 because it is the highest priority bidding device during the preceding cycle 4.

From this FIG. 2A sequence it can be seen that the lowest priority device N keeps bidding for the bus but it never gets to use the bus. This is because devices of higher priority are simultaneously bidding for the bus. Consequently, device N gets "starved out" from using the bus for an indefinite period of time; which eventually causes data buffers in that device to "overflow" and/or "underflow".

This "starve out" problem has been resolved in the prior art by modifying the bus controller to take a "snapshot" of all of the devices that simultaneously bid for the use of the bus and thereafter only grant the use of the bus to those devices whose bids are in the snapshot. Suppose, for example, that five different devices simultaneously bid during one cycle for the use of the bus. In that case, the bus controller would allocate the next five cycles to those five devices; and if any other devices requested the bus during those five cycles, they would be ignored. Then, after the five cycles had passed, the bus controller would take a new snapshot and the process would be repeated.

Figure 2B:
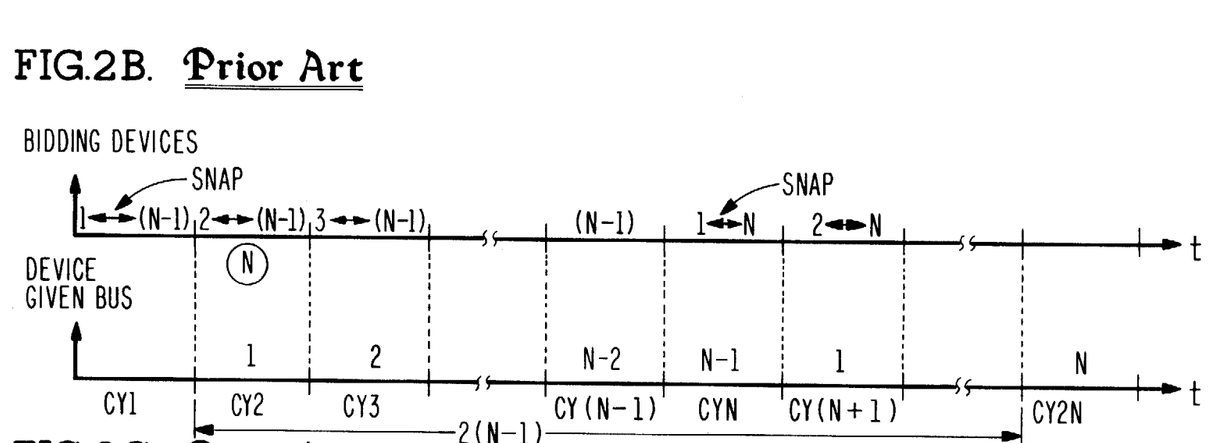
Figure 2C:
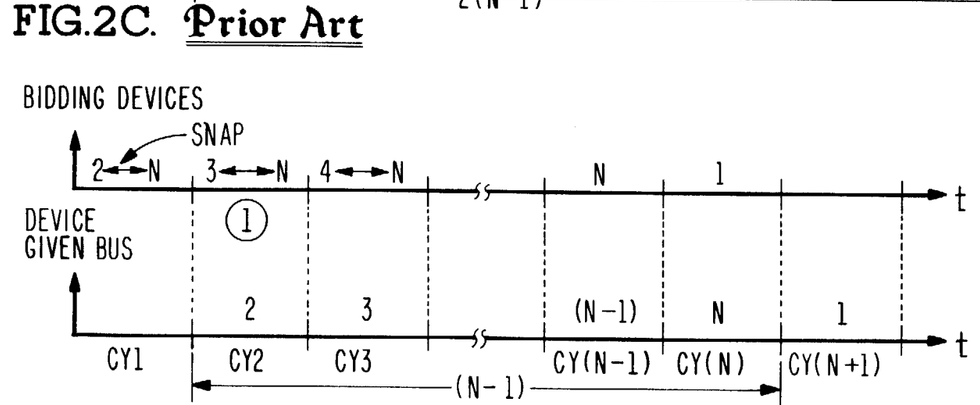

This "snapshot" mechanism solves the above-described "starve out" problem of FIG. 2A; but it also creates two new problems that are illustrated in FIGS. 2B and 2C. FIG. 2B shows that while a low priority device can no longer be starved off of the bus indefinitely, it still can be temporarily "locked out" from the bus for as many as $2(N-1)$ cycles. Further, FIG. 2C shows that even the highest priority device on the bus may now be locked out from the bus for as many as $(N-1)$ cycles. Consequently, overflows and underflows will occur in both the low priority and high priority devices unless they contain enough buffering to continue their operations during these locked-out cycles.

Consider now in detail the sequence of FIG. 2B. In that sequence, all of the devices except device N bid for the use of the bus during cycle 1 and a snapshot of those bidding devices is taken. Then in cycle 2, device N desires the use of the bus; but its bid is ignored by the bus controller (as indicated by the encircled N) because of the preceding snapshot. That is, cycles 2, 3, ... N are already allocated to those $N-1$ devices which requested the use of the bus during cycle 1.

Thereafter, during cycle N, a new snapshot is taken. This time, assume that all of the devices along with device N are requesting the use of the bus. Then cycles $N+1$ through $2N$ will be allocated to the devices having their bids in the second snapshot. And device N will be allocated cycle 2N because it has the lowest priority. Thus, a total of $2(N-1)$ cycles occur between the time when device N initially wanted to use the bus and the time when it actually obtained the use of the bus.

Next, consider in detail the sequence of FIG. 2C, which is the largest lockout sequence for the highest priority device 1. There, all of the devices except device 1 bid for the use of the bus during the first cycle; and a snapshot of those bids is taken by the bus controller. Then, during cycle 2, device 1 wants to use the bus but it cannot because cycles 2 through N are already allocated to those devices whose bids are stored in the preceding snapshot. Subsequently, during cycle N a new snapshot is taken; and device 1, being the highest priority device, will be given the bus in the next cycle. But a total of (N−1) cycles occur between the time that device 1 initially wanted to get onto the bus and the time that it actually got the bus.

These problems as described above in conjunction with FIGS. 2A, 2B, and 2C, also occur in a single bus system as well as the dual bus system of FIG. 1. But in the dual bus system, they give rise to still other problems. To understand this dual bus problem, consider the case where devices on bus A are sending messages through device IB to other devices on bus B. A question then arises as to what priority device IB should be given on bus B in order to minimize the lockout time in all of the other devices.

Suppose, for example, that device IB is given the highest priority on bus B. In that case, messages from high priority devices on bus A will retain their high priority on bus B and so overflows/underflows in the high priority device on bus A will be minimized. However, if several low priority devices on bus A also transmit messages through device IB to other devices on bus B, then messages from those low priority devices will also be given priority over all messages from devices on bus B. So overflows/underflows in high priority devices on bus B will be increased because a high priority device on bus B will now have to wait for all of the low priority devices on bus A before it is given the bus.

Conversely, suppose that device IB is assigned a low priority on bus B. In that case, messages from low priority devices on bus A that pass through device IB to other devices on bus B will retain their low priority. So the chances for an overflow/underflow of a high priority device on bus B will be minimized. However, messages from high priority devices on bus A that pass through device IB to devices on bus B will also be given a low priority on bus B. So the chances of overflows/underflows occurring in the high priority devices on bus A will be greatly increased.

Accordingly, it is a primary object of this invention to provide an improved circuit for incorporation into a device on a time shared bus to control the sequence by which that device bids for the use of the bus.

Another object of the invention is to provide an improved device on a time-shared data bus which bids for the use of that bus in a manner heretofore not attained.

Another object of the invention is to provide an improved system comprised of a plurality of devices coupled to a time shared bus wherein the longest lockout time for each and every device on the bus is less than that attained in the prior art.

Still another object of the invention is to provide an improved dual bus system comprised of first and second buses having respective pluralities of devices coupled thereto with one device being coupled to receive messages from the first bus and transfer them to the second bus wherein the longest lockout time for the pluralities of devices is decreased over the prior art.

BRIEF SUMMARY OF THE INVENTION

These and other objects are accomplished by providing an improved bid control circuit for incorporation into a device on a time-shared data bus to control the sequence by which that device bids for the use of the bus. In one preferred embodiment, the bid control circuit includes a means for determining if a bid from that device to use the bus is the highest priority bid being made, a means for storing all bids other than its own bid upon the determination that its bid has the highest priority and that other devices were bidding for the bus and lost, and a means for inhibiting its own future bids until those devices having their bids stored have obtained the use of the bus subsequent to the storing operation.

BRIEF DESCRIPTION OF THE DRAWINGS

Various features and advantages of the invention are described herein with reference to the accompanying drawings wherein.

DETAILED DESCRIPTION OF THE INVENTION

Figure 3:
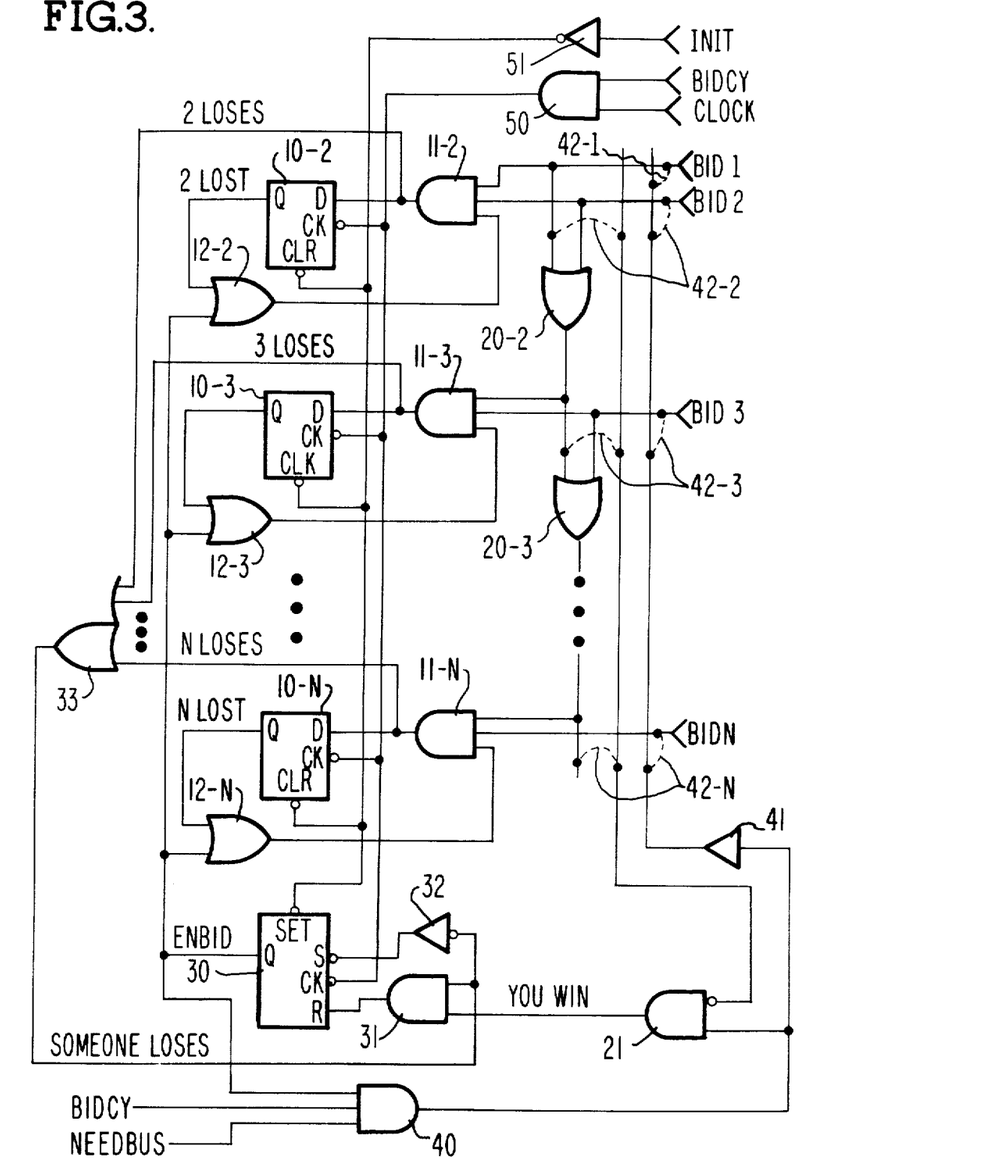
FIG. 3 is a detailed logic diagram of one preferred embodiment of a bid control circuit that is constructed according to the invention.

Reference should now be made to FIG. 3 wherein one preferred embodiment of a bid control circuit that is constructed according to the invention is illustrated in detail. This bid control circuit is incorporated into each and every device on the time-shared buses of FIG. 1, and the bus controllers in FIG. 1 are eliminated.

What the FIG. 3 circuit does in each device is monitor the bidding from all of the devices on the time-shared bus to determine which device is making the highest priority bid. Then the bid control circuit in the particular device that is making the highest priority bid for the bus takes a "snapshot" of the losing bids. That is, when a device bids and wins, it remembers which other devices bid and lost. No snapshots are taken during that cycle by the bid control circuits in any of the other devices on the bus. Thereafter, bids are inhibited from the one device that bid and won until all of the devices in its snapshot are granted the use of the bus.

In other words, during each cycle on the bus in which there are multiple bidders, one of those devices takes its own snapshot of the other bidders. That device in which the snapshot is taken is the device with the highest priority bid. Thus, the snapshot taken by one device when it is the highest priority bidder generally is totally different than the snapshot taken by another device when it is the highest priority bidder.

By this mechanism, the longest lockout time for the lowest priority device on a system having N devices on one bus is N cycles, as opposed to 2(N−1) cycles. Also, the longest lockout time for any device on the system is no more than N cycles. Further, in a dual bus system that incorporates this invention, the maximum lockout time of a high priority device on one bus that transmits messages to the other bus through a device having a low priority on that other bus is reduced from 2(N−1) cycles to N cycles.

Considering now the details of the FIG. 3 bid control circuit, all of the logic there illustrated is identified as follows. Reference numerals 10-2 through 10-N indicate a plurality of N−1 D-type triggerable flip-flops. Reference numerals 11-2 through 11-N indicate a total of N−1 three input AND gates. And reference numerals 12-2 through 12-N indicate a total of N−1 two input OR gates. In general, these logic components serve as a means for storing all of the bids from other devices that bid with a lower priority than the particular device into which this bid control circuit is incorporated.

Also included in the FIG. 3 circuit is a total of N−2 two input OR gates. Two of those OR gates are indicated by reference numerals 20-2 and 20-3 while the others are implied by the sequence of dots. In general, these OR gates in combination with an AND gate 21 serve as a means for determining if the bid from the particular device in which this bid control logic is incorporated is the highest priority bid being made.

Further included in the bid control circuit of FIG. 3 is a single triggerable set-reset flip-flop 30, a two input AND gate 31, an inverter 32, and an OR gate 33. In general, these components provide a means for inhibiting future bids from the device into which the bid control logic is incorporated until all of those devices having their bids stored have obtained the use of the bus subsequent to the storing operation.

Also, the FIG. 3 circuit includes a three input AND gate 40, a bus driver 41, and a plurality of selectable conductors 42-1 through 42-N. Conductor 42-1 is installed only if the bid control logic is to be incorporated into the highest priority device on the system; conductors 42-2 are installed only if the bid control logic is to be incorporated into the second highest priority device on the system, etc. The selectable conductor on the output of driver 41 fixes the priority with which a particular device bids; and the selectable conductor on the input of gate 21 identifies the devices having higher priority bids.

Two other logic gates 50 and 51 also exist in the FIG. 3 circuit. Gate 50 logically ANDs a timing signal clock and a bid cycle signal BIDCY that come from the bus; and the output signal from that gate triggers all of the flip-flops on its falling edge. That falling edge indicates the end of one bid cycle and the start of a new cycle. Inverter 51 buffers an initiate signal INIT from the bus which clears all of the flip-flops 10-2 through 10-N and sets flip flop 30 when signal INIT is true.

Consider now in detail the sequential operation of the above described FIG. 3 logic. Note that in this timing diagram it is assumed that signal BIDCY is always true and therefore it is now shown. In other words, it is assumed that separate bid lines and data lines exist so bids for the bus occur during each cycle. Alternatively, however, the bid lines and the data lines may be time-shared; in which case the bid cycles illustrated in FIG. 4 would be spaced apart and interleaved with data cycles, and signal BIDCY would be true only during the bid cycles.

Figure 4:
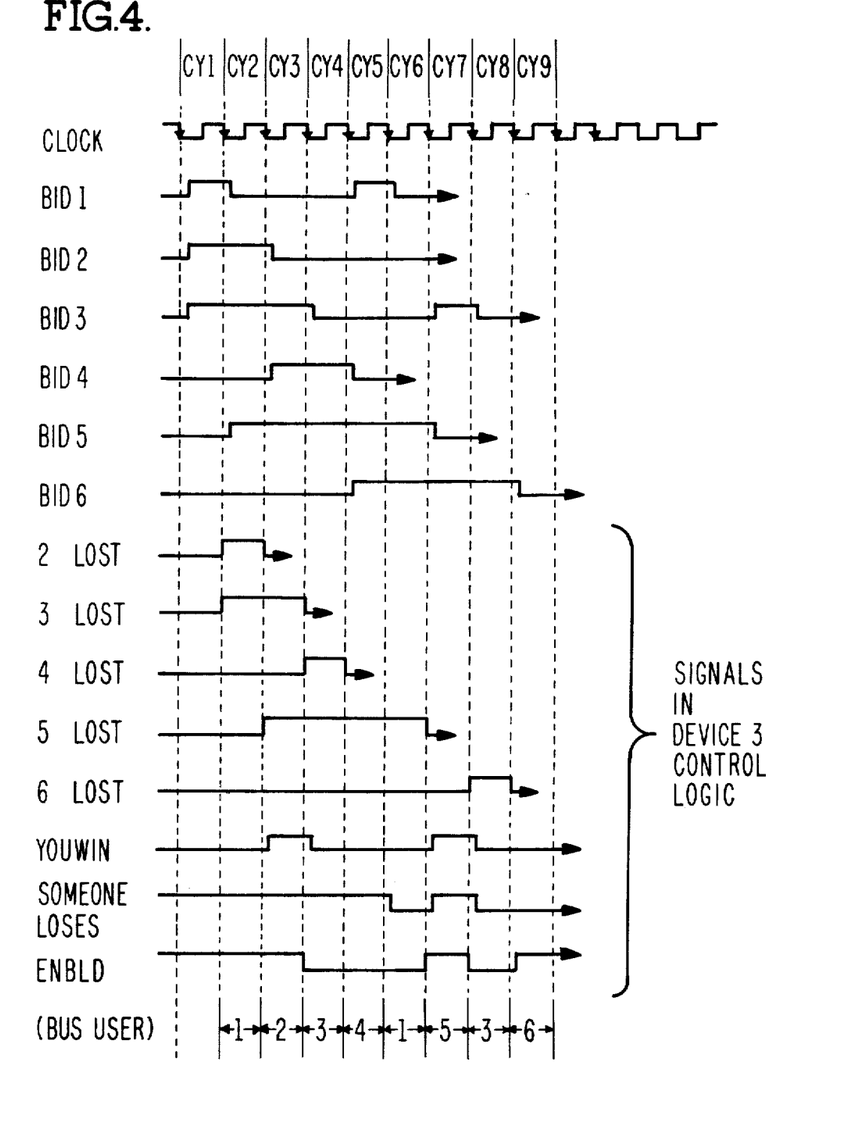
FIG. 4 is a timing diagram illustrating a sequence of various signals within the bid control circuit of FIG. 3.

Also, in the timing diagram of FIG. 4 it is assumed that a total of six devices are time-sharing the bus. Thus, the bid signals are BID 1, BID 2, . . . BID 6, and the signals from flip-flops 10-2 through 10-N are 2 LOST, 3LOST, . . . 6LOST. These latter signals together with three other signals,—YOU WIN, SOMEONE LOSES and ENBID—are illustrated as they occur in device 3, the device having the third highest priority.

During cycle 1, devices 1, 2, and 3 all bid for the bus. This they do by making signal NEEDBUS true on AND gate 40. Initially, the other two inputs to AND gate 40 are also true, so the output of that gate causes driver 41 to send a BID signal. Device 1, having the highest priority, wins the bidding and is granted the bus during cycle 2. Devices 2 and 3 both lost their cycle 1 bid for the bus; and this is indicated by signals 2LOST and 3LOST being high during cycle 2.

Also during cycle 2, devices 2 and 3 again bid for the use of the bus along with device 5. Of these devices, device 2 has the highest priority and so it is granted the bus during cycle 3. Accordingly, signals 3LOST and 5LOST go true during cycle 3 to indicate that those devices lost their bid during cycle 2.

During cycle 3, devices 3 and 5 again bid for the bus along with device 4. Of these, device 3 has the highest priority and so signal YOU WIN in device 3 goes high. Also, since devices 4 and 5 are bidding for the use of the bus during cycle 3, the signal SOMEONE LOSES is high during that cycle. This concurrence of YOU WIN and SOMEONE LOSES during cycle 3 causes flip-flop 30 to reset (i.e.,—causes signal ENBID to go low) at the beginning of cycle 4.

With cycle ENBID low, the plurality of flip-flops 10-2 through 10-N cannot set but can reset. This means that a snapshot of the losing bidders was taken by those flip-flops in device 3 at the end of the cycle when device 3 bid for the bus and won. As long as signal ENBID in device 3 stays low, all further bids from that device are inhibited by AND gate 40.

During cycle 4, devices 4 and 5 again bid for the bus; and device 4 wins since it has the highest priority. So during cycle 5, device 4 is given the bus and signal 4LOST goes low.

During cycle 5, devices 1 and 6 begin to bid for the bus along with the previously bidding device 5. Device 1 has the highest priority so it is given the bus during cycle 6. Note that device 1 was not locked out from using the bus by the snapshot taken at the beginning of cycle 4 in device 3. Note also that device 3 during cycle 6 does not recognize that device 6 bid for and lost that cycle. This is because device 3 previously took its snapshot at the beginning of cycle 4 and all of the devices in that snapshot have not yet been given the use of the bus.

During cycle 6, devices 5 and 6 again bid for the bus. Device 5 wins; and it is the last device having its bid stored in the lost flip-flops 10-2 through 10-N in device 3. So the signal SOMEONE LOSES in device 3 goes low which indicates that all of the devices in the preceding snapshot have subsequently been granted the use of the bus. In response to this low at the beginning of cycle 7, signal ENBID goes high (i.e.,—flip-flop 30 sets).

With signal ENBID high, device 3 is enabled to bid again for the bus; which it does during cycle 7. This bid is the highest priority bid being made; and so device 3 is given the bus during cycle 8. Also, the concurrence of signal YOU WIN and SOMEONE LOSES during cycle 7 causes flip-flop 30 to reset (i.e.,—causes signal ENBID to go low) at the beginning of cycle 8. Thus a new snapshot is taken in which device 6 is recognized as having bid and lost when device 3 won. This is indicated by signal 6LOST going high at the beginning of cycle 8.

During cycle 8, device 6 again bids for the bus and this time it wins. This causes the signal SOMEONE LOSES to go low during cycle 8; and that causes signal ENBID to go high at the beginning of cycle 9. Finally, during cycle 9, device 6 is given the bus and all of the signals in the FIG. 3 logic are back in the same state that they initially had at the beginning of the first cycle.

Figure 5A:
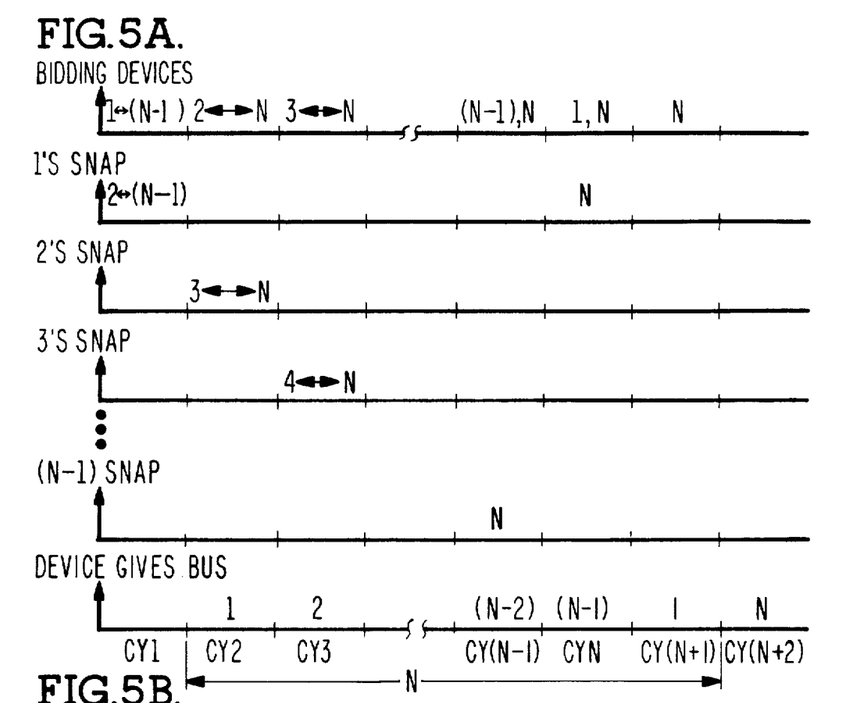
FIGS. 5A and 5B are timing diagrams illustrating how the circuit of FIG. 3B handles the prior art problems that were depicted in FIGS. 2A-2C.

Turning now to FIG. 5A, it will be shown that the maximum lockout time of the lowest priority device on a bus is N cycles in a system of N devices in which each incorporate the priority control circuit of FIG. 3. This lockout time was previously shown in conjunction with FIGS. 2B to be $2(N-1)$ cycles in the prior art. That worst case lockout time occurred when during the first cycle, all of the devices except the lowest priority device bid for the use of the bus; then during the second cycle, the lowest priority device bid for the bus; and then during the Nth cycle, all of the devices again bid for the bus.

This sequence is illustrated in FIG. 5A. During cycle 1, all of the devices except the lowest priority device bid for the bus. Device 1 has the highest priority, and so that device takes a snapshot of the losing bidders. That snapshot is indicated in cycle 1 of FIG. 5A as consisting of devices 2 through $N-1$.

Then in cycle 2, device N begins to bid along with the previously bidding devices 2 through $N-1$. Device 2 has the highest priority; and so device 3 takes the snapshot of the losing devices. Thus, device 2 remembers that devices 3 through N were bidding and lost.

Similarly, in cycle 3, device 3 is the highest bidder for the bus; and so it takes a snapshot and remembers that devices 4 through N were bidding and lost. This sequence continues in a similar fashion until in cycle $N-2$ only devices $N-1$ and N remain as bidders. Device $N-1$ wins the bid and it is given the bus during cycle N. Also, since device $N-1$ is the last device in the snapshot taken by device 1, device 1 is now enabled to bid again for the bus.

Thus, during cycle N of FIG. 5A, device 1 is indicated as bidding for the bus along with device N. Note that none of the other devices 2 through $N-1$ are allowed to bid since they still have device N in their snapshot. Device 1 has the highest priority bid during cycle N, so it takes a new snapshot and is given the bus in the next cycle.

At that point, all of the devices 1 through $N-1$ have device N in their snapshot; and so during cycle $N+1$, device N is the only bidding device. Thus it is given the bus during cycle $N+2$. Inspection of FIG. 5A then shows that device N was locked off of the bus for a total of only N cycles.

Figure 5B:
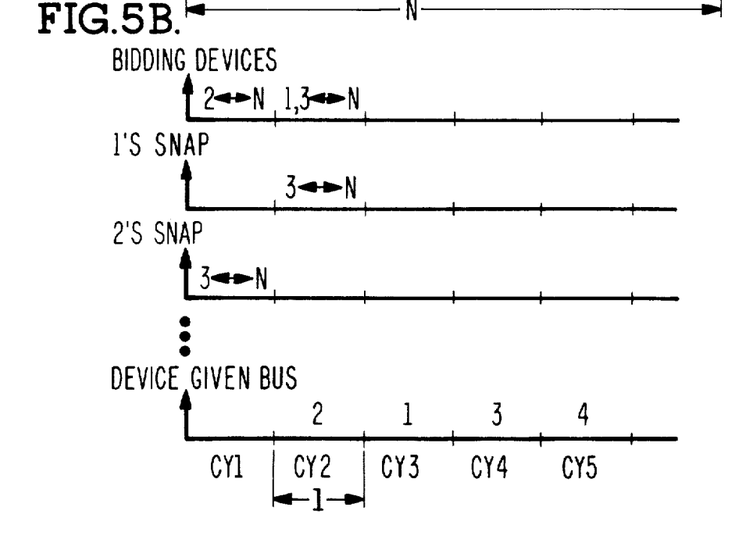

Consider now the timing diagram of FIG. 5B which corresponds to the prior art sequence of FIG. 2C. That latter sequence caused the highest priority device to be locked off of the bus for a total of $N-1$ cycles. That occurred when during the first cycle, all of the devices except the highest priority device bid for the use of the bus; and then during the second cycle, the highest priority device bid for the bus.

In cycle 1 of FIG. 5B, all of the devices except the highest priority device bid for the bus. Device 2 is the highest priority bidding device and so device 2 takes a snapshot of the losing devices 3 through N. But this snapshot does not prevent device 1 from bidding. It only prevents device 2 from bidding for the bus until devices 3 through N have used the bus.

Thus, during cycle 2, device 1 is free to bid for the bus along with devices 3 through N. Device 1, being the highest priority bidder during cycle 2, is given the bus during cycle 3. So in this case, the highest priority device 1 is locked out from the bus for only one cycle.

After device 1 obtains the bus in cycle 3, its snapshot will show that devices 3 through N simultaneously bid for the bus and lost. So device 1 will be locked off the bus after cycle 3 for a total of $N-3$ cycles. But this subsequent lockout time for a high priority device is precisely what is needed in order to shorten the lockout time for all of the other lower priority devices. And the longest that this lockout time for device 1 can be after it obtains the bus is $N-1$ cycles—which occurs when all of the devices request the bus at the same time.

Consider now the two bus system of FIG. 1 in which each device incorporates the circuit of FIG. 3 and in which device IB is assigned the highest priority on bus B. In that case, when a high priority device on bus A transmits messages through device IB to other devices on bus B, the high priority of those messages is retained in bus B. But in addition, low priority devices on bus A which transmit messages through device IB to other devices on bus B will not adversely affect the lockout time of high priority devices on bus B because, as shown above, the lockout time for any of N devices on one bus (e.g.,—even the lowest priority devices on bus B) never exceeds N cycles.

What is claimed is:

1. A system comprised of a plurality of devices coupled to a time-shared data bus where each device includes a means for sending messages over said bus in a time-shared fashion; the improvement being that at least three of said devices incorporate their own bid control circuit which is comprised of:
   means for bidding for the use of said bus with a priority which is fixed;
   means for determining if a bid from the device into which said circuit is incorporated is the highest priority bid being made by said plurality of devices;
   means for storing all bids other than its own bid upon said determination that the bid from the device into which said circuit is incorporated is the highest priority bid being made; and
   means for inhibiting all bids from the device into which said circuit is incorporated, after said storing operation, until each of said stored bids has thereafter become the highest priority bid being made.

2. A system according to claim 1 wherein said means for determining includes an ORing means for generating a signal representing the logical OR of all of said bids having a higher priority than the bid from the device into which said circuit is incorporated, and an ANDing means for logically ANDing the inverse of said signal with the bid from said device into which said circuit is incorporated.

3. A system according to claim 1 wherein said means for storing includes a plurality of flip-flop means for storing respective bids from said plurality of devices with each respective bid being logically ANDed with the logical OR of all bids having a higher priority.

4. A system according to claim 1 wherein said means for inhibiting includes a flip-flop means for entering one state when multiple devices of said plurality bid for said bus and said means for determining determines the bid from the device into which said circuit is incorporated is the highest priority bid being made, and for entering an opposite state when all of said devices having their bids stored by said means for storing have obtained the use of said bus subsequent to the storing operation.

5. A system including a plurality of devices for sending messages over a data bus that is time-shared; said devices including respective means for generating prioritized bids for the use of said bus with the highest priority bid being given the use of said bus; wherein more than three of said devices further include:

their own individual control circuit means for suspending all further bids from the device into which the circuit is incorporated after that device is given the use of said bus until any of the other devices that also bid for the use of said bus but lost have subsequently again bid for and obtained the use of said bus.

6. A system according to claim 5 wherein said control circuit means includes:
   means for determining if a bid from the device into which the circuit is incorporated is the highest priority bid being made;
   means for storing all bids from the other devices upon said determination that said bid from the device into which the circuit is incorporated is the highest priority bid being made; and
   means for inhibiting all future bids from the device into which the circuit is incorporated until said other devices having their bids stored have bid and obtained the use of said bus subsequent to said storing operation.

7. A system according to claim 6 wherein said means for storing includes a plurality of flip-flop means for storing respective bids from said other devices with each respective bid being logically ANDed with the logical OR of all bids having a higher priority.

8. A system according to claim 6 wherein said means for inhibiting includes a flip-flop means for entering one state when multiple devices of said plurality bid for said bus and said means for determining determines the bid from the device into which the circuit is incorporated is the highest priority bid being made, and for entering an opposite state when all of said other devices having their bids stored by said means for storing have obtained the use of said bus subsequent to the storing operation.

9. A dual bus system comprised of a first plurality of devices coupled to a first time-shared data bus for sending messages over said first bus in a time-shared fashion, a second plurality of devices coupled to a second time-shared data bus for sending messages over said second bus in a time-shared fashion, and another device coupled to both said first and second buses for receiving messages from said devices on said first bus and for sending said received messages to said devices on said second bus; wherein said device of said first and second pluralities and said another device including a means for bidding for the use of the respective bus on which they send messages with a priority which is fixed with the highest priority bidder on each bus being given that bus to use; and wherein said another device includes a control circuit means for suspending all further bids from said another device after said another device is given the use of said second bus until any devices of said second plurality that also bid for the use of said second bus but lost to said another device have subsequently again bid for and obtained the use of said second bus.

* * * * *